April 1, 1930.  H. BUTLER  1,753,043

ELECTRIC MEASURING INSTRUMENT

Filed March 23, 1928  3 Sheets-Sheet 1

INVENTOR
Howard Butler
BY *Munn & Co.*
ATTORNEY

April 1, 1930. H. BUTLER 1,753,043
ELECTRIC MEASURING INSTRUMENT
Filed March 23, 1928 3 Sheets-Sheet 2

INVENTOR
Howard Butler
BY
ATTORNEY

April 1, 1930.  H. BUTLER  1,753,043
ELECTRIC MEASURING INSTRUMENT
Filed March 23, 1928   3 Sheets-Sheet 3

INVENTOR
Howard Butler
BY Drummie
ATTORNEY

Patented Apr. 1, 1930

1,753,043

UNITED STATES PATENT OFFICE

HOWARD BUTLER, OF FOUR OAKS, ENGLAND

ELECTRIC MEASURING INSTRUMENT

Application filed March 23, 1928, Serial No. 264,186, and in Great Britain April 1, 1927.

This invention relates to electrical measuring or indicating instruments and has for its object to provide a simple and inexpensive instrument for use in connection with secondary batteries for the purpose of giving an indication of the amount of electrical energy in the battery at any particular time.

The instrument constructed according to the present invention is primarily intended for use upon motor cars so that the driver may have an indication which will enable him to judge when the battery requires recharging, and the instrument may include means for indicating when the battery is being recharged.

The instrument which I employ for the purpose referred to is a modified form of volt meter one of the essential features of the instrument being a coil through which current from the battery is passed this coil forming or actuating a member which moves in a magnetic field and which carries or operates an indicator.

In volt meters as at present constructed the amount of angular movement that can be obtained by the member which moves in a magnetic field is limited to an angle of 90° or thereabouts and at present the whole of this movement is employed to give readings from zero up to the maximum voltage to be measured by the instrument.

In using a secondary battery or accumulator, however, it is only desired to indicate that portion of the whole range of readings lying between the maximum capacity of the battery and the safe minimum capacity of the battery. With an ordinary volt meter this part of the range of readings would occupy only about two thirds or at the most three quarters of the movement of the indicator and the present invention provides a means whereby the whole of the movement of the indicator can be employed for indicating the range from the maximum capacity of the battery down to the safe minimum.

In order to effect this the member which moves in a magnetic field and which operates the indicator of the instrument is loaded either by a spring or otherwise so that no movement thereof takes place until the current passing through the energizing coil reaches that obtained at the safe minimum for the battery. In this way a longer and more easily read scale or its equivalent is obtained giving readings from the maximum capacity down to the safe minimum.

Upon the instrument I may either use a pivoted arm moving over a curved scale or I may use an arm carrying a sector like member having a number of sections of different colours this arm operating behind a disc having an opening through which the colours show in succession so that the driver is made aware by the colour shown what is the condition of his battery.

If a scale is used it may be calibrated to indicate volts or/and ampere hours, i. e. when the accumulator is fully charged the position of the pointer on the scale is marked with the accumulator capacity, say 30 ampere hours, and then a current of one ampere is run from the accumulator and hourly readings are taken and marked on the scale.

When the accumulator has reached a condition at which it is undesirable to take further energy from it, the pointer will be at or near one end of the scale and the marking of this point may be zero.

The actual zero position, i. e. the position of the pointer when there is no current flowing will, however, be off the scale altogether.

Stops may be provided near the ends of the scale to limit the movement of the pointer.

That end of the scale which bears the zero marking may have its last one or two divisions coloured, say red, to indicate that the discharge point has almost been reached, or instead of, or in addition to, being calibrated in figures, the scale may be marked in colours and used in conjunction with a key stating the value or significance of the colours.

If an indicator is used showing through an opening, it may have a number of coloured or other marked areas adjacent to each other and these will be shown through the opening in the front of the instrument in succession as the voltage in the battery decreases.

Such an instrument is preferably provided with a key to the colours or other markings so that the driver can correctly interpret the signals.

Referring to the drawings:—

Figure 1:
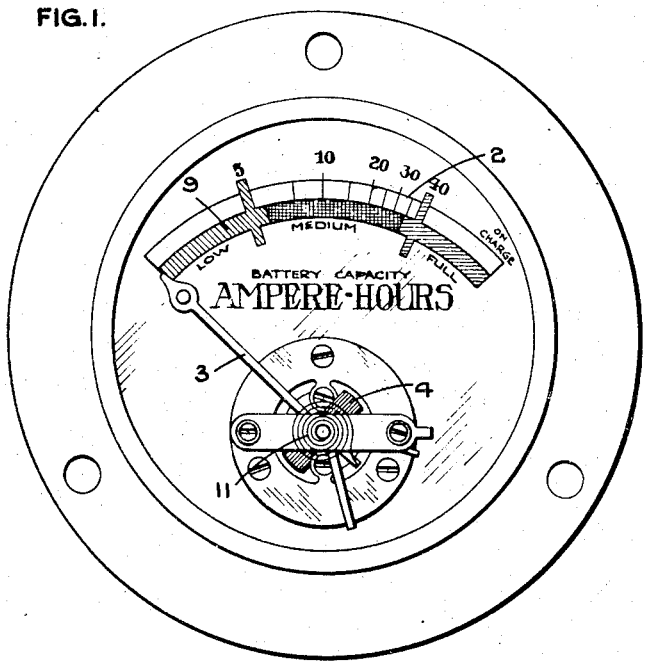
Figure 1 is a front view showing one form of instrument constructed in accordance with this invention.
Figure 2:
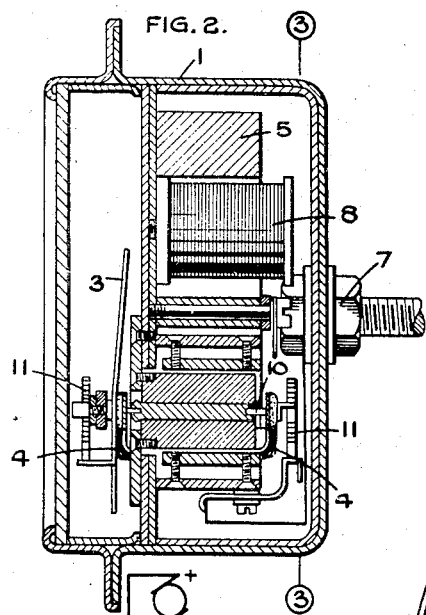
Figure 2 is a sectional view.
Figure 3:
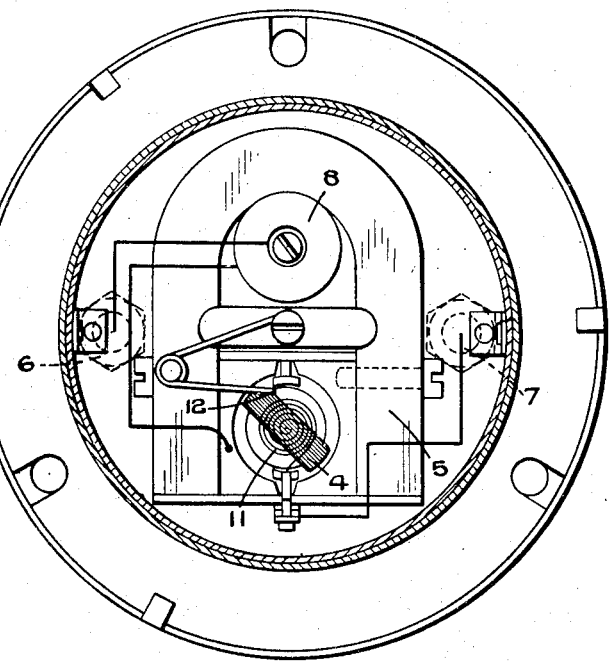
Figure 3 is a sectional view on line 3—3 of Figure 2.

In the construction shown in Figures 1 to 3 I provide an electrical measuring instrument for the purpose specified comprising a casing 1 including a scale 2 over which a pointer 3 or other member is adapted to move.

The pointer 3 is carried by a moving coil 4 formed of fine wire disposed between the poles 5 of a permanent magnet, the ends of the wire coil 4 being connected to suitable points or terminals 6 and 7 on the instrument, a resistance coil 8 being included in series in this circuit. The terminals 6 and 7 are adapted to receive wires or other connectors for connecting the instrument to a battery or accumulator.

The pointer or the coil or the pivot 10 carrying them is acted upon by springs 11 tending to move the pivot so that the coil engages a resilient wire stop 12.

A shunt load coil, preferably arranged externally of the apparatus is provided directly across the terminals 6, 7 i. e. across the battery or the like to which the moving coil is connected, for the purpose of reproducing in the instrument the actual discharge conditions. This shunt load coil is not shown in the drawings as it is of the usual construction.

It is desirable, but not absolutely necessary, that this shunt load coil should be approximately equivalent to one quarter of the actual capacity of the battery or accumulator.

When the instrument is fixed to a motor car or the like the lamps could be used as the external shunt and the instrument would be calibrated according to the consumption of the lamps in use on the car.

The pointer may be associated with any suitable known damping device whereby the pointer is prevented from oscillating in use and which will render it dead beat.

When the instrument is designed for use with an accumulator which would normally register two volts and have an actual capacity of 40 ampere hours, the scale is preferably divided up into a number of divisions reading from 0 to 40, a portion 9 of the scale near its "low" end being preferably coloured in red, this portion representing a danger period below which it is not advisable to allow the accumulator or battery to discharge.

When an accumulator has been recharged the voltage given is generally slightly above the normal voltage of the accumulator, in the case of an accumulator of the two volt type, the voltage generally being from 2.5 to 2.7 volts and this voltage progressively falls during the discharge of the accumulator to approximately 1.7 volts which is the minimum safe voltage to which the discharge of the accumulator should be carried.

In order that the instrument can be used with accumulators, for example, of the two volt, four volt, and six volt type, a plurality of scales may be provided, whilst if desired only one scale may be employed with each instrument, the scales being interchangeable.

Figure 4:
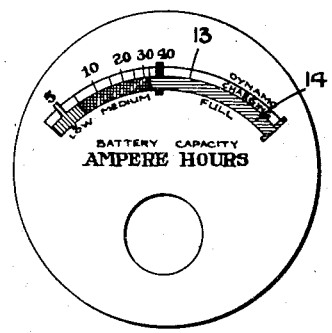
Figure 4 is a front view showing another form of scale which may be used with the instrument.

If required, the number of turns provided in the springs 11 may be somewhat reduced so that a greater resistance to the movement of the indicating arm is provided. With such an arrangement a scale such as is shown in Figure 4 may be used, this scale having the advantage that the part 13 is continued to a point 14 which, when reached by the indicating arm, indicates that the dynamo should be switched off as the conditions in the battery will then be such that further charging would lead to damage.

In the arrangement shown in Figures 5 to 8, the instrument comprises a casing 15 having a permanent magnet 16 between the poles of which is a pivot 17 upon which is mounted a swinging armature 18, movements of which are controlled by a stationary core 19 within a coil 20 which is placed in the battery circuit.

The swinging armature 18 is provided with an extension 21 which moves between two resilient stops 22 and 23.

The swinging armature is further provided with a sector like indicator 24 having sections 25, 26, 27 and 28 of different colours or otherwise marked differently.

A resistance coil 29 is provided in series with the coil 20 for adjustment purposes.

The face of the instrument is provided with an opening 30 and with a key 31 showing the conditions indicated by the different colours or markings which show through the opening 30 for different positions of the armature 18.

The section 28 is in line with the opening 30 when the instrument is out of circuit but the other sections show progressively low, medium and full power in the battery. When the instrument is out of circuit, the armature 18 is retained in the position shown in Figures 6 and 8, i. e. pressing lightly against the stop 22 by the magnetic field produced by the permanent magnet.

Figure 9:
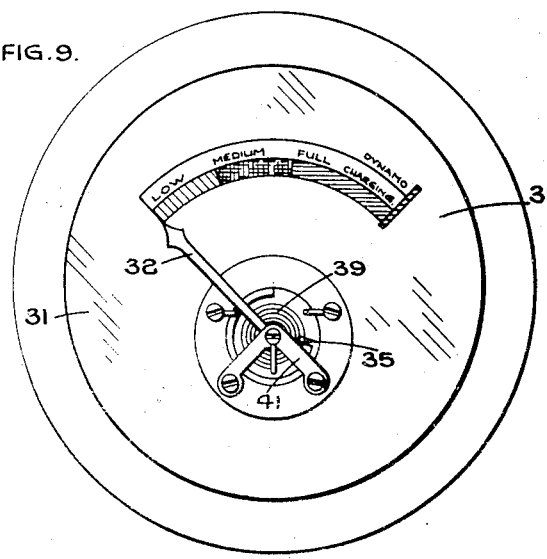
Figure 9 is a view in front elevation of a further form of the invention.
Figure 11:
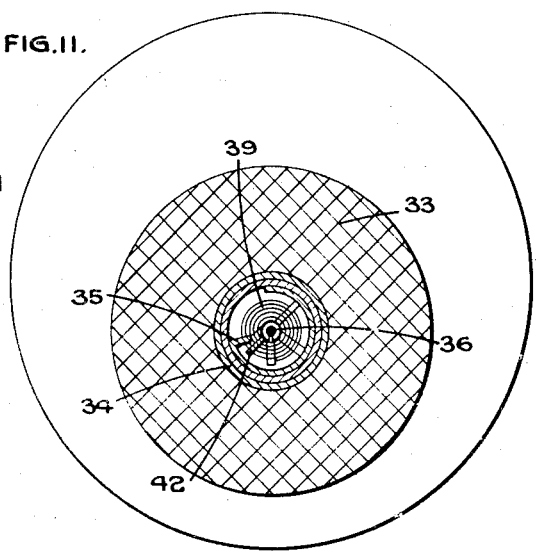
Figure 11 is a sectional front view.
Figure 10:
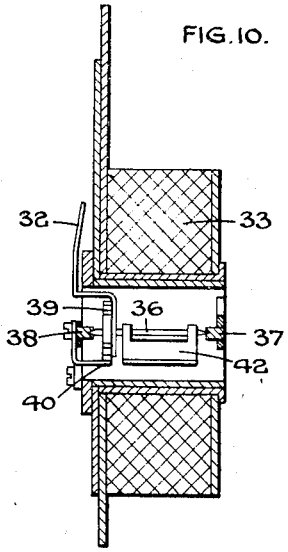
Figure 10 is a sectional view in side elevation.

In the construction shown in Figures 9, 10 and 11, the general form of the dial 31 is similar to that shown in Figure 4 but in this construction the pointer 32 is operated by means of a coil 33 forming a solenoid.

Within the coil is a fixed member 34 of soft iron having an inwardly projecting part 35.

Mounted centrally within the coil is a spindle 36 which can rotate freely in bearings 37, 38.

The spindle 36 carries the pointer 32 and is also acted upon by a suppressed spring 39 one end of which is fixed to the spindle 36 and the other end of which is fixed to a stop piece 40 fixed on a bracket 41.

The spindle 36 has mounted thereon a soft iron vane 42.

With this arrangement when current is passed through the coil 33 the vane 42 and the part 35 are magnetized to the same polarity. As the part 35 is fixed, the vane 42 rotates in a clockwise direction (Figure 9) proportionally to the voltage of the current in the coil 33.

Figure 12:
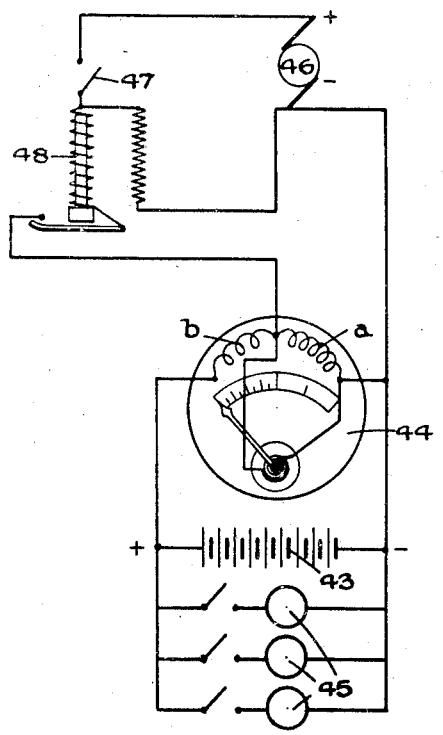
Figure 12 is a wiring diagram showing the circuit as applied to a vehicle.

Referring to Figure 12 the battery is shown at 43 and the instrument at 44, the shunt coil $a$ being either the coil 4 (Figures 1 to 3) or the coil 20 (Figures 6 to 8) or the coil 33 (Figures 9 to 11).

When a secondary battery is being charged there is a considerable variation in the voltage of the battery at a given degree of charge, the voltage depending upon the rate at which the battery is being charged. For instance, if the charge rate exceeds the normal then the battery will give a higher voltage at a given degree of charge than if the charge rate is normal.

A further object of the present invention is to introduce a means of rectifying this variation and according to this feature of the present invention I introduce into the instrument a compensating factor for variations in the charge rate this factor preferably taking the form of a series winding arranged to have a de-grading effect upon the reading.

I have found that the voltage reading obtained from a 12 volt battery which is charged at half charge rate is approximately .5 of a volt less, at the same degree of charge, than that obtained at the full charge rate and similarly if the full charge rate is exceeded the voltage obtained from the battery at the same degree of charge will be proportionately higher than that obtained at normal charge rate.

In practice I convert this difference into ampere turns on the particular instrument under consideration and these turns give the amount of series winding which is required in the main circuit for correction, the magnetic flux of these series turns opposing the flux produced in the shunt coil so as to give the necessary de-grading effect upon the instrument.

The series winding which constitutes the compensating factor is shown at $b$. The lamps or other load on the battery are shown at 45 and the charging dynamo at 46, while 47 shows a switch and 48 represents diagrammatically a cut out.

It will be understood that the compensating winding may either compensate by its magnetic effect or by providing an additional potential drop and its effect depends upon the position in which it is put and this varies as circumstances require or as desired so long as in all arrangements where the magnetic effect is to be employed the winding of the series coil is in such a direction as will cause the magnetic field set up when a current is passed through the coil to oppose the flux of the magnet or the coil 20.

In the construction shown in Figures 9 to 11 the series winding $b$ may be placed around the coil 33 and arranged in such manner as to oppose the flux produced by the coil.

Figure 13:
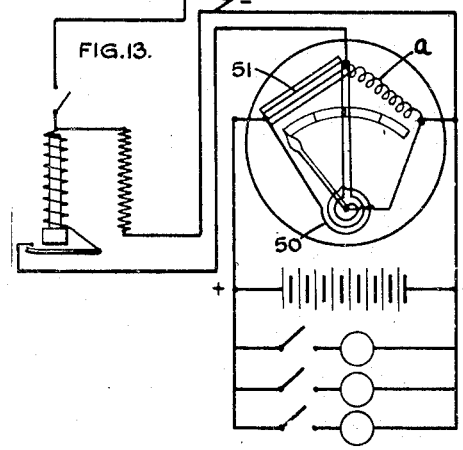
Figure 13 is a diagram showing another form of circuit which may be used.

If the compensating coil is applied to the poles of the permanent magnet it may tend to de-magnetize them and for this reason I may employ the arrangement which is illustrated in the diagram Figure 13 wherein the compensating coil 50 is shown applied or operating in conjunction with the coil which takes the battery voltage. With this arrangement it is necessary to employ a shunt 51 operating in conjunction with the compensating coil 50.

Figure 8:
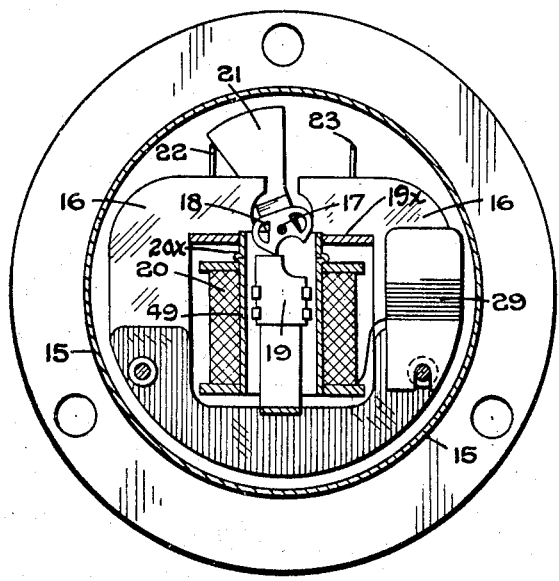
Figure 8 is a sectional view on line 8—8 of Figure 7.

Thus the compensating coil instead of being applied to the magnet can be applied to the moving coil 4 of Figures 1–4 or to the coil 20 shown in Figure 8.

Figure 5:
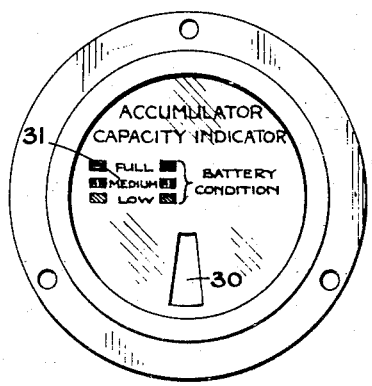
Figure 5 is a front view showing another form of instrument constructed in accordance with this invention.
Figure 6:
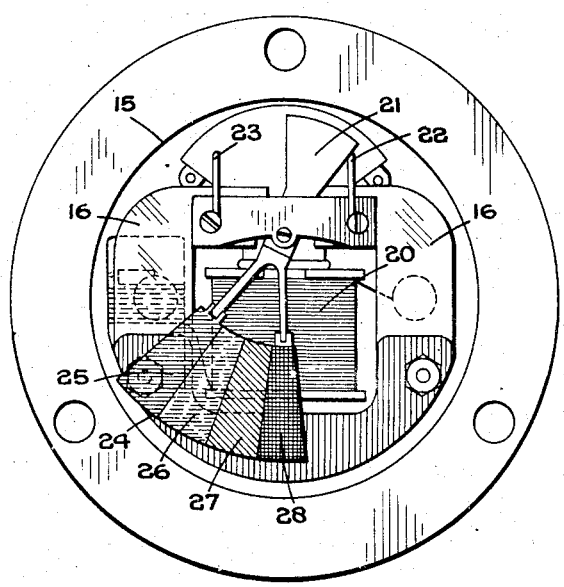
Figure 6 is a view of the instrument shown in Figure 5 but with the front disc removed.
Figure 7:
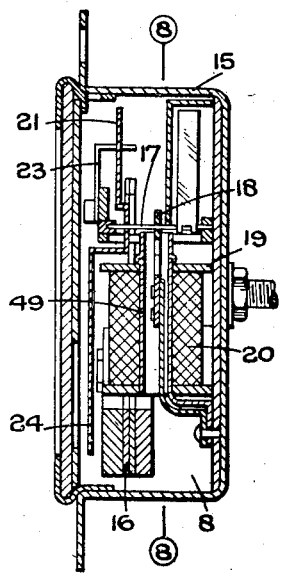
Figure 7 is a sectional view.

It will be understood that any of the three forms of the instrument which are described may either have a pointer moving over the fixed scale or may have an indicating quadrant divided into sections which show successively from an opening as described with reference to Figures 5 and 6.

The instrument may be used either for portable testing or it may be fitted to a motor car dash board for indicating the condition of the battery of the car.

In order to obtain a correct reading of the ampere hours in the battery, it is necessary to see that the dynamo is not charging and it is necessary to place a load on the battery which can either be done by momentarily switching on the car lights or placing a shunt load in the circuit.

A switch may be fitted to the circuit if required so that the instrument need only be brought into operation when required, but it is considered to be advantageous to leave the instrument in circuit continuously.

It will be seen that by using a suppressed pointer I obtain a scale having a length between those points or markings on the scale which indicate the maximum or fully charged voltage and the safe minimum voltage of a battery respectively, that is considerably greater, say eight, more or less, time greater, than the length of the corresponding part of the scale of an ordinary volt meter with an unsuppressed needle. This comparatively great scale area permits of the scale being calibrated so that accurate readings can be taken and has other obvious advantages. This part of the scale may be graduated in volts or/and ampere hours when a load equivalent to a ten or twenty hours' continuous discharge is put across the battery, and by placing a series winding in the charge circuit, as previously described, the magnetic field set up by this winding by the passage of current through the winding and which magnetic field varies in intensity according to the variations of the charging current, can be employed for opposing the flux set up by the shunt coil.

When calibrating the scale the fully charged position of the battery is marked on the scale when the charge current is passing through the series winding at the normal rate simultaneously with the passage of the current through the instrument.

What I claim then is:—

An instrument for indicating electric battery charge comprising in combination a movable indicator, electro-magnetic means adapted to actuate said indicator, a dial relative to which the said indicator moves to indicate the condition of the battery, means whereby definite conditions, as low, medium and fully charged conditions, of the battery are indicated by the position of the indicator relative to the dial, suppression means associated with said indicator adapted to withhold the indicator against movement until a predetermined battery condition has been reached, said electro-magnetic operating means for said indicator comprising a moving iron fixed to the movable indicator, a fixed iron, an actuating coil adapted to be placed in circuit with the battery being tested and adapted to create a magnetic field about said irons when current passes through said coil and so similarly magnetize by induction the irons, whereby they repel one another and actuate the indicator to an extent depending on the condition of the said battery, an automatically operating compensating winding included in the wiring of the instrument and adapted to enable the instrument to register the true condition of the battery irrespective of the boosting of the voltage due to excessive rate of charging, said compensating winding being placed concentrically with respect to the said actuating coil and being such that the magnetic field set up thereby when an electric current flows through it opposes the magnetic effect of the actuating coil on the indicator.

In witness whereof I affix my signature.

HOWARD BUTLER.